(12) United States Patent
Kim et al.

(10) Patent No.: US 7,011,414 B2
(45) Date of Patent: Mar. 14, 2006

(54) HIGHLY EFFICIENT PROJECTION SYSTEM AND COLOR SCROLLING METHOD THEREFOR

(75) Inventors: Dae-sik Kim, Suwon-si (KR); Kun-ho Cho, Suwon-si (KR); Sung-ha Kim, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/653,427

(22) Filed: Sep. 3, 2003

(65) Prior Publication Data

US 2004/0114112 A1 Jun. 17, 2004

Related U.S. Application Data

(60) Provisional application No. 60/454,354, filed on Mar. 14, 2003.

(30) Foreign Application Priority Data

Sep. 4, 2002 (KR) ...................... 10-2002-0053321

(51) Int. Cl.
*G03B 21/00* (2006.01)
*G03B 21/14* (2006.01)
*H04N 9/31* (2006.01)
*G02B 26/08* (2006.01)
*G02B 27/10* (2006.01)

(52) U.S. Cl. ............................ 353/31; 353/37; 353/84; 353/102; 359/205; 359/210; 359/623; 348/742; 348/744; 348/761; 362/293

(58) Field of Classification Search ................. 353/31, 353/84, 103, 20, 34, 119, 81, 96, 37, 102; 359/196, 205, 209, 210, 621, 623, 629, 638; 348/196, 742, 743, 744, 757, 760, 761; 362/293, 362/281; 349/8
See application file for complete search history.

(56) References Cited

U.S. PATENT DOCUMENTS

| | | | |
|---|---|---|---|
| 5,278,595 A | 1/1994 | Nishida et al. | |
| 5,969,832 A * | 10/1999 | Nakanishi et al. | ............. 359/15 |
| 6,288,815 B1 * | 9/2001 | Lambert | ..................... 359/196 |
| 6,334,685 B1 | 1/2002 | Slobodin | |
| 6,361,172 B1 * | 3/2002 | Brennesholtz | ............... 353/81 |
| 2002/0008196 A1 | 1/2002 | Hatakeyama et al. | |
| 2004/0160656 A1 * | 8/2004 | Hewlett et al. | ............. 359/237 |

FOREIGN PATENT DOCUMENTS

| | | |
|---|---|---|
| EP | 0 683 610 A2 | 11/1995 |
| EP | 0 683 610 A3 | 11/1995 |
| EP | 1 052 856 A2 | 11/2000 |
| EP | 1 098 536 A2 | 5/2001 |
| WO | 9603842 A1 | 2/1996 |

* cited by examiner

*Primary Examiner*—W. B. Perkey
*Assistant Examiner*—Rochelle Blackman
(74) *Attorney, Agent, or Firm*—Sughrue Mion, PLLC

(57) ABSTRACT

A highly efficient projection system and a color scrolling method are provided. In the color scrolling method, first, an optical splitter splits a beam emitted from a light source into individual color beams. Next, a rectangular light valve is disposed such that its long axis is along the direction into which the optical splitter splits the beam. Thereafter, the individual color beams are scrolled in the long axial direction of the light valve. The color scrolling in the long axial direction can increase light efficiency much more than a color scrolling performed in a short axial direction.

7 Claims, 8 Drawing Sheets

HIGHLY EFFICIENT PROJECTION SYSTEM AND COLOR SCROLLING METHOD THEREFOR

CROSS REFERENCE TO RELATED APPLICATIONS

This is an application filed under 35 U.S.C. § 111(a) claiming benefit pursuant to 35 U.S.C. § 119(e)(1) of the filing date of Provisional Application No. 60/454,354 filed on Mar. 14, 2003, pursuant to 35 U.S.C. § 111(b), the disclosure of which is incorporated herein in its entirety by reference.

This application also claims the priority of Korean Patent Application No. 2002-53321, filed on Sep. 4, 2002, in the Korean Intellectual Property Office, the disclosure of which is incorporated herein in its entirety by reference.

BACKGROUND OF THE INVENTION

1. Field of the Invention

The present invention relates to a projection system having increased optical efficiency by performing a color scrolling in the long axial direction of a light valve, and a color scrolling method therefor.

2. Description of the Related Art

Projection systems are classified into 3-panel projection systems and single-panel projection systems according to the number of light valves for controlling the on/off operation of light emitted from a high-output lamp on a pixel-by-pixel basis and forming a picture. The single-panel projection systems can have a smaller optical system than the three-panel projection systems but provide only ⅓ of the optical efficiency of the three-panel projection systems, because R, G, and B colors into which white light is separated are sequentially used. Hence, attempts to increase the optical efficiency of single-panel projection systems have been made.

In a general single-panel projection system, white light radiated from a white light source is separated into R, G, and B colors using color filters, and the three colors are sequentially sent to a light valve. The light valve operates according to the sequence of colors received and creates images. As described above, a single-panel optical system sequentially uses colors, so the light efficiency is reduced to ⅓ of the light efficiency of a three-panel optical system. A scrolling method has been proposed to solve this problem. In a conventional color scrolling method, white light is separated into R, G, and B color beams, and the three color beams are simultaneously sent to different locations on a light valve 100 as shown in FIG. 1. In other words, the light valve 100 is divided into three areas, and R, G, and B color beams are focused on their corresponding areas. Each of the color areas is referred to as a color bar. Since an image cannot be produced until the R, G, and B color beams respectively reach all pixels of the color areas in the light valve, color bars are moved at a constant speed by a color scrolling means. The movement of color bars is referred to as color scrolling.

In the above-described color scrolling method, three R, G, and B color beams are not sequentially used but simultaneously used. Accordingly, the optical efficiency of single-panel projection systems adopting the color scrolling method can be increased. In single-panel projection systems adopting this color scrolling method, the light valve 100 generally has a rectangular shape with an aspect ratio of 4:3 or 16:9. In the rectangular light valve 100, a shorter side is referred to as a short axial direction, and a longer side is referred to as a long axial direction. As shown in FIG. 1, R, G, and B color bars formed on the light valve 100 are shifted in the short axial direction of the light valve 100. The color bar shifting (i.e., color scrolling) in the short axial direction of a light valve is not good in view of optical efficiency. This will be compared with the present invention later.

SUMMARY OF THE INVENTION

The present invention provides a projection system designed so that color scrolling is performed in the long axial direction of a light valve, and a color scrolling method therefor.

According to an aspect of the present invention, there is provided a projection system in which an optical splitter splits a beam emitted from a light source into individual color beams, a scrolling unit scrolls the individual color beams and focuses the scrolled color beams on a light valve, and the light valve processes the scrolled color beams according to an input image signal to form a color image, magnifies the color image, and projects the magnified color image toward a screen. The light valve is disposed such that its long axis is in a direction where the optical splitter splits the incident beam into individual color beams, so that light efficiency is increased.

According to one aspect of the present invention, if the screen is installed such that its short axis is in the long axial direction of the light valve, first and second reflection mirrors are included.

According to one aspect of the present invention, the first reflection mirror is inclined by 45 degrees with respect to an optical axis on a light path between the screen and the light valve. The second reflection mirror is inclined by 45 degrees with respect to an optical axis such that a beam reflected by the second reflection mirror is rotated by 90 degrees from a beam incident upon the first reflection mirror.

According to another aspect of the present invention, there is provided a color scrolling method including the following steps of splitting a beam emitted from a light source into individual color beams using an optical splitter, of disposing a rectangular light valve such that its long axis is in the direction where the optical splitter splits the beam, and of scrolling the individual color beams in the long axial direction of the light valve.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

To achieve a color scrolling method according to the present invention, a rectangular light valve is installed such that its long axis is parallel to the direction in which light emitted from a light source is split into color beams by an optical splitter. In other words, because the color splitting direction is the same as the long axial direction of the light valve, color bars are formed on the light valve in its long axis direction. Color scrolling in the long axial direction of the light valve is performed by a color scrolling unit.

The present invention is applicable to all projection systems that produce color images using a scrolling method. A projection system according to an illustrative, non-limiting embodiment of the present invention includes a light source, an optical splitter for splitting light emitted from the light source into color beams according to wavelength, a scrolling unit for scrolling color beams produced by the optical splitter, and a light valve for producing color images by turning on or off pixels according to an input image signal. The color beams transmitted by the optical splitter and the scrolling unit are focused on the light valve in such a way that different color beams are focused on different areas. The light valve is installed such that its long axis direction is parallel to the direction in which the light splitter splits incident light into beams of individual colors.

Figure 1:
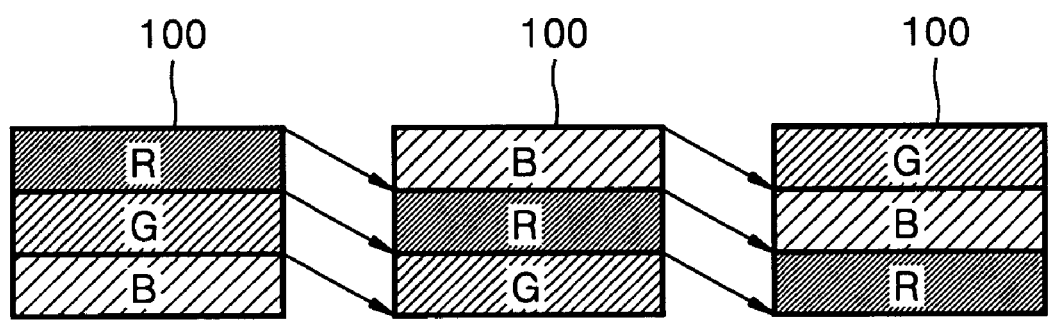
FIG. 1 illustrates a conventional color scrolling method.
Figure 2A:
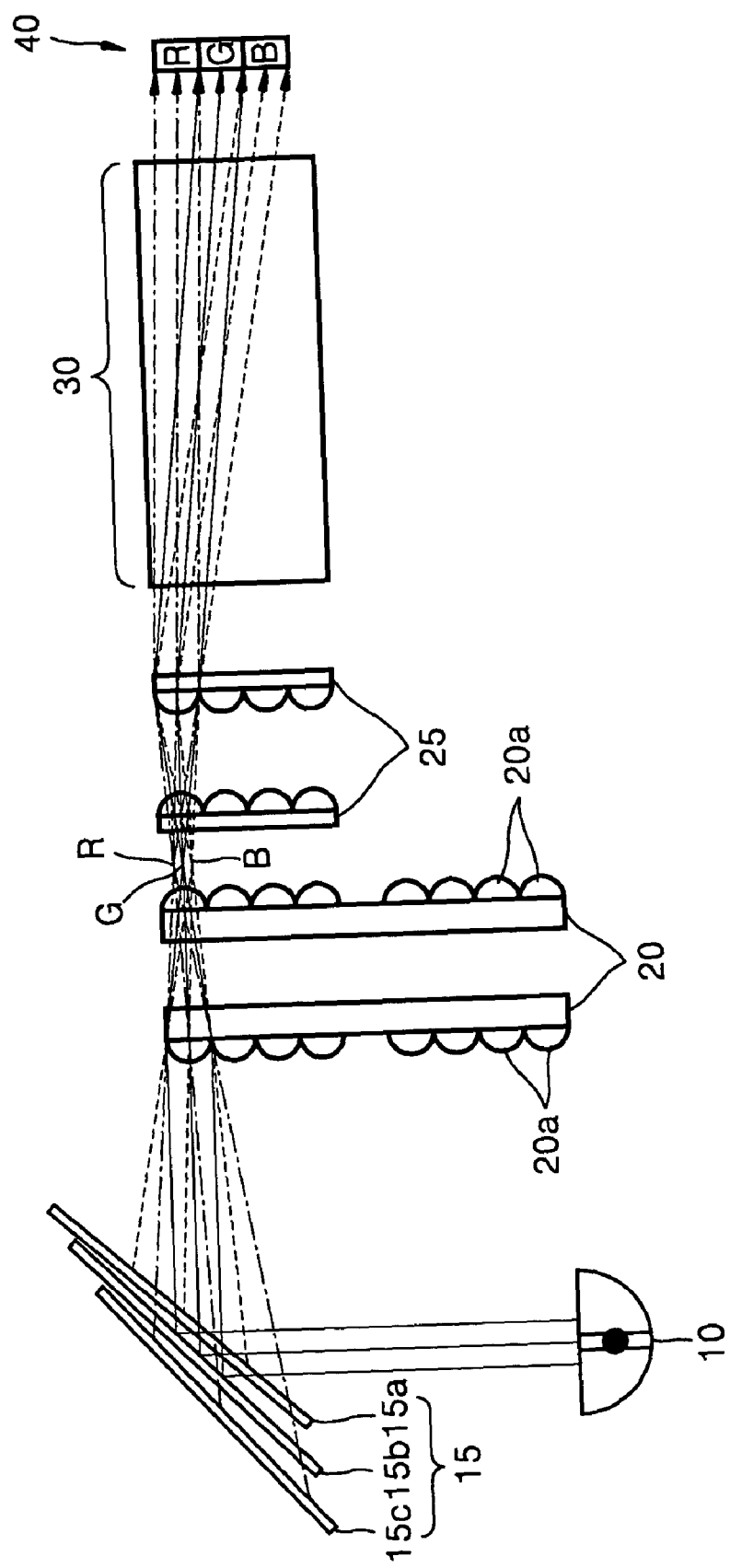
FIG. 2A is a schematic diagram of a projection system disclosed in Korean Patent Application No. 2002-40399.

An example of a projection system to which a color scrolling method according to the present invention is applicable is shown in FIG. 2A. The projection system of FIG. 2A includes a light source 10, an optical splitter 15 for splitting a light beam emitted from the light source 10 according to wavelength, a scrolling unit 20 for scrolling three red (R), green (G), and blue (B) color beams produced by the optical splitter 15, and a light valve 40 for processing the scrolled R, G, and B beams according to an image signal to obtain a color image.

Figure 2B:
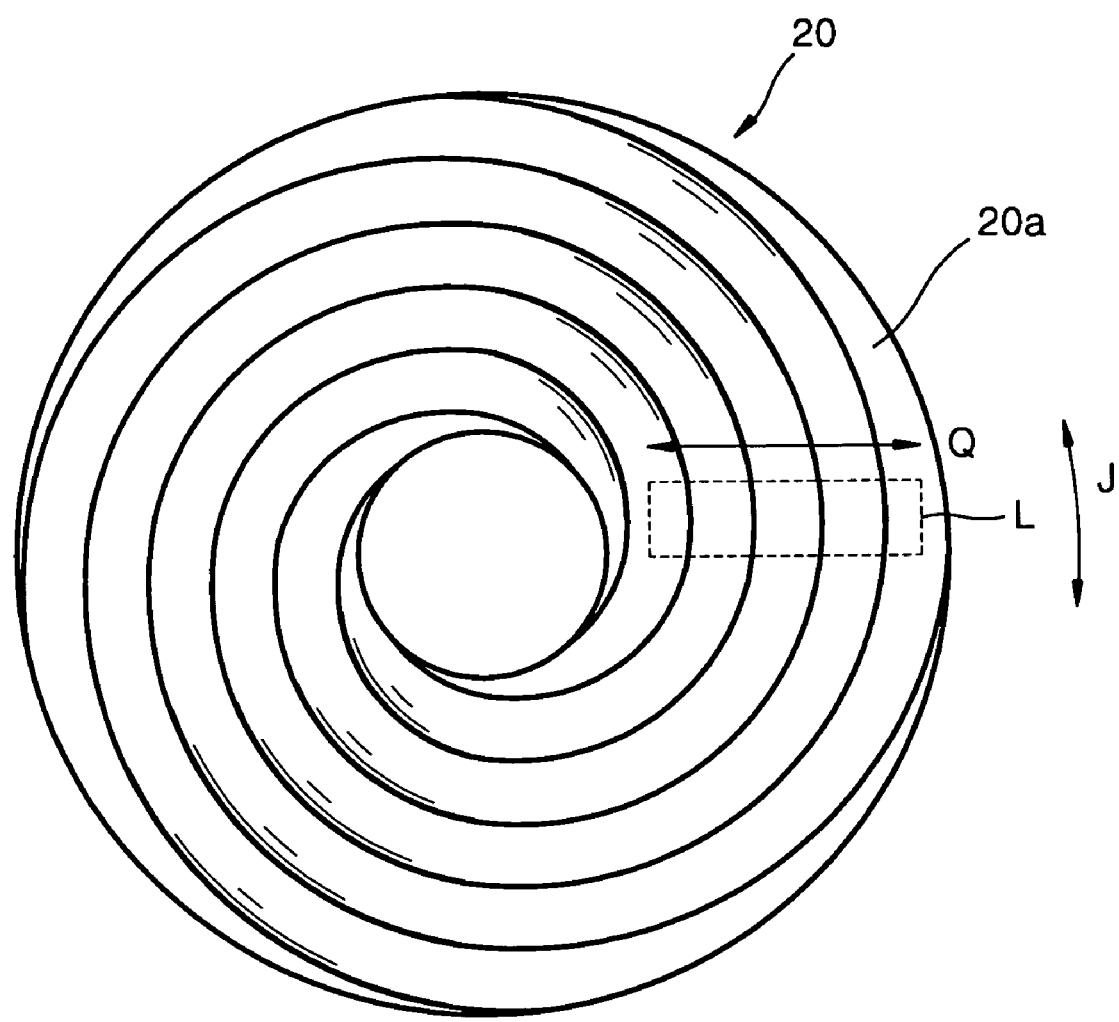
FIG. 2B shows directions in which a light separator shown in FIG. 2A separates light according to color.

The scrolling unit 20 includes at least one lens cell 20a, as shown in FIGS. 2A and 2B. A rotation (which occurs in direction J) of the scrolling unit 20 is converted into a rectilinear motion (which occurs in direction Q) of portions of the lens cells 20a defined by an area, indicated by L, through which a beam passes.

The lens cells 20a may be cylindrical lenses or may be spirally arranged.

The scrolling unit 20 may be formed in a disk or cylinder shape. The light valve 40 processes the R, G, and B beams scrolled by the scrolling unit 20, according to an image signal to obtain a color image.

A fly eye lens array 25 and a lens group 30 may be further installed on a light path between the scrolling unit 20 and the light valve 40. The color image formed by the light valve 40 is magnified and projected by a projection lens unit (not shown) toward a screen.

As described above, the light beam emitted from the light source 10 is split into the three R, G, and B color beams by the optical splitter 15. For example, the optical splitter 15 may have first, second, and third dichroic filters 15a, 15b, and 15c inclined at different angles with respect to the axis of the incident light beam. The optical splitter 15 splits the incident light beam into beams with different wavelengths and makes the beams with different wavelengths advance at different angles. For example, the first dichroic filter 15a reflects an R beam with a red wavelength included in an incident white beam and transmits G and B beams with the other wavelengths. The second dichroic filter 15b reflects a G beam with a green wavelength out of the beams transmitted by the first dichroic filter 15a and transmits the remaining B beam. The third dichroic filter 15c reflects the B beam with a blue wavelength, which is transmitted by the first and second dichroic filters 15a and 15b.

The three R, G, and B color beams separated according to wavelength by the first, second, and third dichroic filters 15a, 15b, and 15c, respectively, are reflected at different angles. For example, the R and B beams are converged toward the G beam and focused on the scrolling unit 20. The separated individual color beams are scrolled by the scrolling unit 20.

The scrolling unit 20 is formed of cylindrical lens cells that are spirally arranged so that the rotation of the scrolling unit 20 is converted into a rectilinear motion. Due to the conversion of the rotation of the scrolling unit 20 into a rectilinear motion, color scrolling is achieved.

Figure 2C:
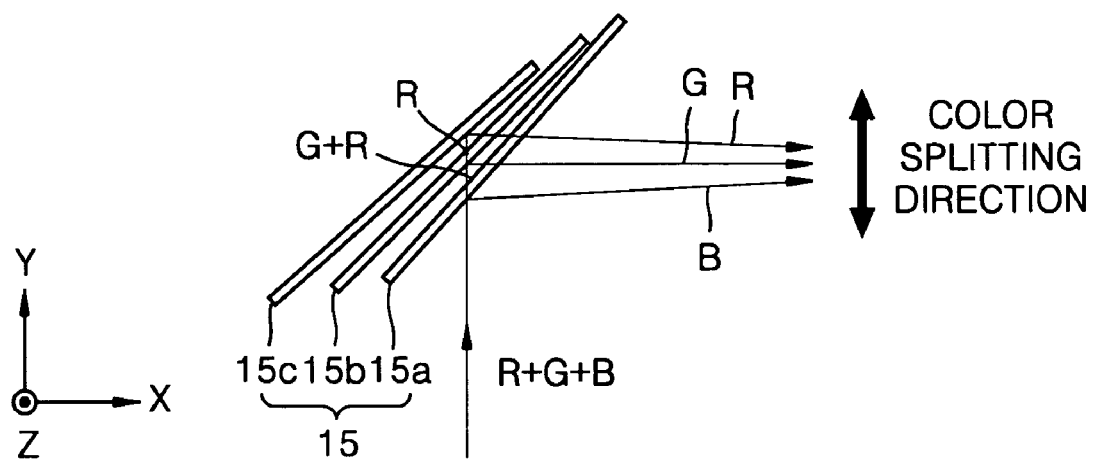
FIG. 2C shows a light valve disposed such that a color scrolling method according to the present invention is implemented.
Figure 2D:
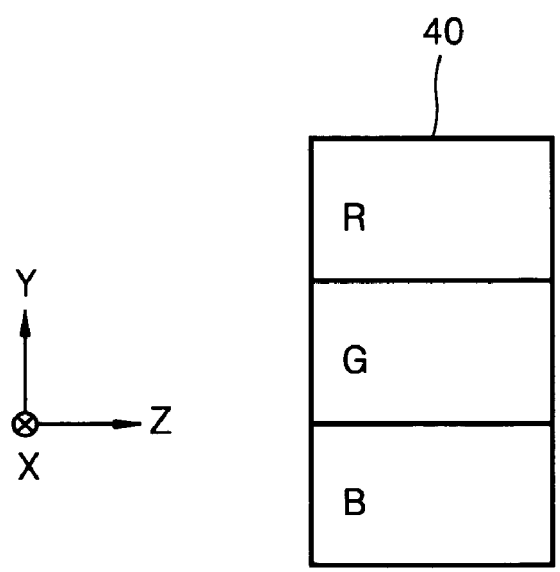
FIG. 2D shows a light valve disposed such that the long axis direction of the light valve is the same as the direction Y in which the white beam is split.

A case in which such a projection system performs a color scrolling method according to the present invention will now be described. FIG. 2C shows in greater detail that a white beam is split into three R, G, and B color beams by the optical splitter 15. Referring to FIG. 2C, the white beam is split into the three R, G, and B color beams in direction Y. Referring to FIG. 2D, the light valve 40 is disposed such that the long axis direction of the light valve 40 is the same as the direction Y in which the white beam is split. Color scrolling is performed in the long axial direction of the light valve 40, thereby forming a color image. In the above projection system, the direction in which beams are transmitted by the scrolling unit 20 must be the same as the color splitting direction.

In the present invention, color scrolling is performed in the long axial direction of a light valve, thereby minimizing an increase of etendue caused by color splitting and improving light efficiency.

The etendue (E) denotes an optical conservation quantity in an optical system and is calculated using the area (A) of an object whose etendue is to be measured and a sine value of $\theta_{1/2}$ to the second power, as shown in Equation 1:

$$E = \pi A \sin^2(\theta_{\frac{1}{2}}) = \frac{\pi A}{4(F/No)^2} \tag{1}$$

wherein $\theta_{1/2}$ denotes half of an angle of a light beam incident upon or emitted from the object with the area (A), and F/No denotes the F-number of lenses used in the optical system. Here, sin ($\theta_{1/2}$) is equal to 1/(2F/No). If the size of a flat panel device is 30 mm×40 mm, and F/No is 3.5, the etendue (E) is calculated as in Equation 2:

$$E = \frac{\pi \times 30 \times 40}{(4 \times 3.5^2)} = 76.9 \text{ (mm}^2 - \text{steradian)} \quad (2)$$

According to Equation 1, the etendue (E) is determined by the area of the object and either the incidence angle of an incident beam or the F-number of lenses. The etendue (E) is a physical quantity that depends on the geometric structure of an optical system. The etendue at the starting point of the optical system must be equal to that at the ending point thereof in order to obtain an optimal light efficiency. If the etendue at the ending point is greater than that at the starting point, the area of the object in Equation 1 is large when F/No is constant. Thus, the optical system becomes bulky. On the other hand, if the etendue at the ending point is smaller than that at the starting point, light loss may be generated.

If the etendue of a light source is high, an angle at which a light beam is incident upon a subsequent lens increases, and accordingly, the incidence surface of the subsequent lens must become larger. The enlargement of the incidence surface of the subsequent lens causes increases in aberration, volume, etc., making it difficult to properly configure the optical system. Therefore, a reduction of the etendue at the starting point of an optical system, for example, at a light source, may be a solution to easily configure an optical system and increase light efficiency. However, if a light source does not change, it is preferable in view of light efficiency that the etendue at the ending point of an optical system is equalized to the etendue at the light source.

The theory of the etendue applied to a projection system will now be described. A light valve used in a projection system generally has a rectangular shape with an aspect ratio of 4:3 or 16:9. The etendue of such a rectangular optical component part is obtained using Equation 3:

$$E = 4A \sin(\theta_{1/2})\sin(\phi_{1/2}) \quad (3)$$

wherein $\theta_{1/2}$ denotes half of an angle at which rays are incident upon the horizontal sides of a light valve, and $\phi_{1/2}$ denotes half of an angle at which rays are incident upon the vertical sides of the light valve. However, because a beam emitted from a light source has a radial, symmetrical profile, the etendue at the rectangular optical component part can be obtained using Equation 1.

In a system which produces a color image using a color scrolling method, a beam emitted from a light source is split into individual color beams, and an individual color beam is focused on a part of the light valve. That is, light is focused on a narrower area than in an existing single-panel projection system in which individual color beams are sequentially focused on the entire surface of a light valve, such that the angle at which light is incident upon the light valve is greater in the projection system adopting the color scrolling method than in the existing single-panel projection system. As the half angle of the incidence angle of light increases, the etendue increases. In other words, because the incidence angle is greater when an individual color beam is incident upon part of a light valve than when an individual color beam is incident upon the entire area of the light valve, the etendue in a single-panel projection system based on color scrolling is greater than in the existing sequential single-panel projection system.

The etendue in a projection system adopting a color scrolling method will now be calculated on the assumption that rays of a beam emitted from a light source are symmetrical and uniform.

Figure 3A:
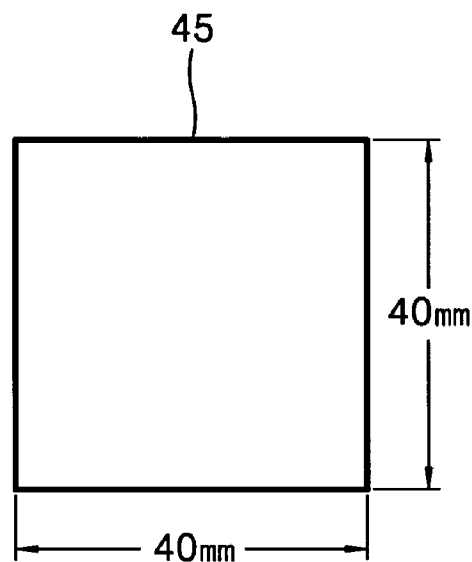
FIG. 3A shows an example of a light source having a symmetric distribution.
Figure 3B:
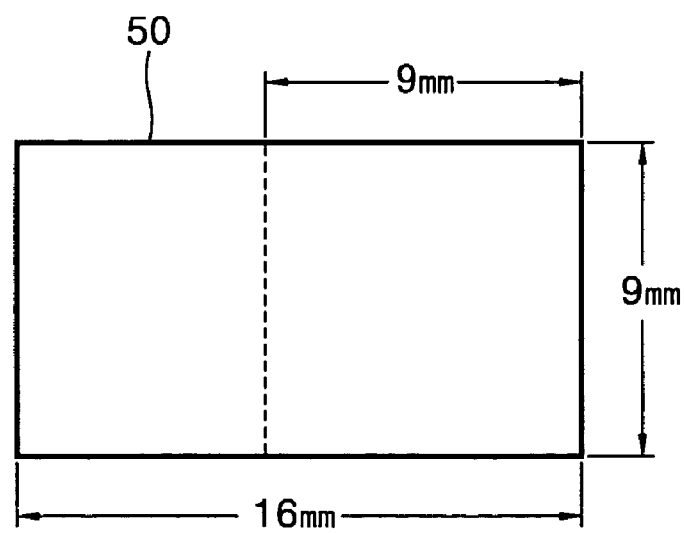
FIG. 3B shows a rectangular light valve.

FIGS. 3A and 3B show a light source 45 and a light valve 50, respectively. The light source 45 is a 40 mm×40 mm square, and it is assumed that the angle at which the light source 45 diverges a beam is ±2 degrees. The light valve 50 is a 16 mm×9 mm rectangle, and it is ideally assumed that the etendue at a light source is equal to the etendue at a light valve. That is, on the assumption that $E_{light\ source}$ is equal to $E_{light\ valve}$, the angle of incidence of light upon a light valve and the F/No of an optical system can be obtained.

The etendue at a light source can be obtained using Equation 1, as shown in Equation 4:

$$E_{light\ source} = \pi A \sin_2(2°) = 6.12 \text{ (mm}^2\text{-steradian)} \quad (4)$$

The angle at which light is incident upon a light valve can be calculated using Equation 5, which shows the relationship that $E_{light\ valve} = E_{light\ source}$:

$$E_{lightvalve} = E_{light\ source} = \pi A \sin^2(\theta_{1/2}) = 6.12 \quad (5)$$

In Equation 5, if the area (A) of the light valve is 144 mm² (that is, 16 mm×9 mm), $\theta_{1/2}$ is 6.7°. Because the light valve is rectangular, the etendue must be calculated using Equation 3. However, when considering that a general illumination system has a symmetrical optical system, the etendue is preferably calculated using Equation 1 on the assumption that the rectangular light valve is a square light valve which corresponds to a square light source. To increase the light efficiency, it is preferable that the incidence angle used in calculating the F/No of an optical system is set with respect to the short axis of the surface of an object whose etendue is to be measured. Hence, if the area (A) of the light valve 50 is assumed as being 81 mm² (9 mm×9 mm), $\theta_{1/2}$ in Equation 5 is 8.9°. Accordingly, using the relationship $\sin(\theta_{1/2}) = 1/(2F/No)$, the F/No of an optical system can be calculated as being F/3.2. In this way, the etendue at a light source is calculated, and accordingly, the etendue at a light valve is calculated.

The etendue, incidence angle, and F/No when scrolling is performed in the short axial direction of a light valve and those when scrolling is performed in the long axial direction of the light valve will now be calculated.

Figure 4A:
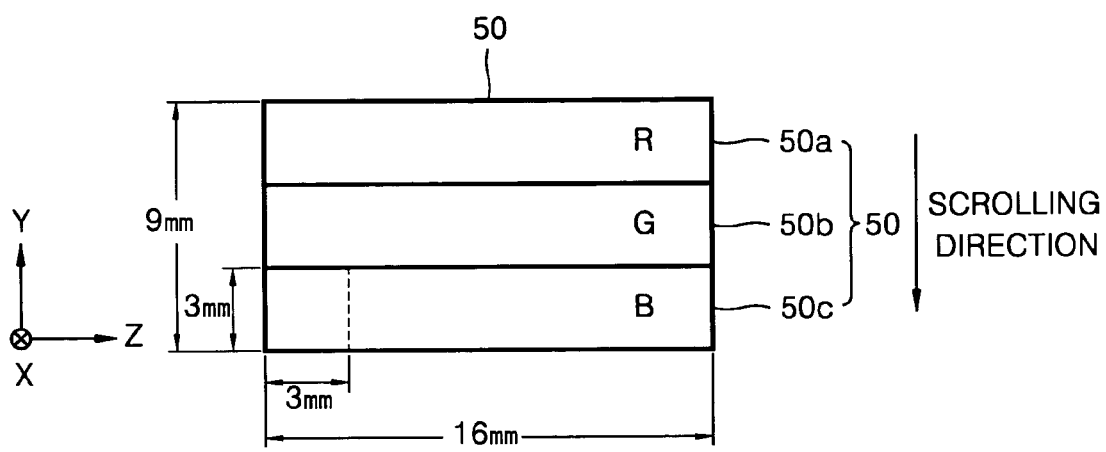
FIG. 4A shows an example of a color scrolling operation performed in the short axial direction of the light valve of FIG. 3B.
Figure 4B:
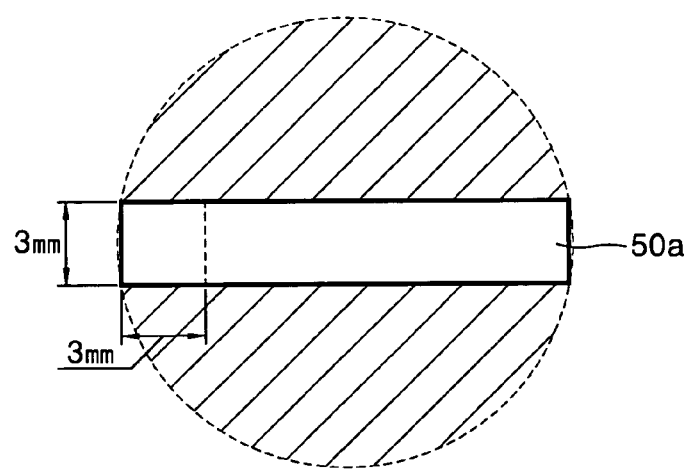
FIG. 4B shows a method of calculating etendue of a color bar in the case of FIG. 4A.

FIG. 4A shows a light valve 50 divided into three color areas 50a, 50b, and 50c in its short axial direction (Y direction). The etendue at one area of the three areas of the light valve 50 will now be calculated. As shown in FIG. 4B, the area (A) of the light valve 50 is 9 mm² (3 mm×3 mm) when being calculated with respect to the length of a color area 50a in the short axial direction. Using Equation 5, 27° of $\theta_{1/2}$ is obtained from $E_{light\ valve} = E_{light\ source} = 6.12$, and an optical system having an F/No of F/1.3 or less must be used. However, an optical system having such an F/No can be manufactured using an expensive specific manufacturing technique and apparatus.

Accordingly, in the case of scrolling in the short axial direction of a light valve, the angle of divergence by a light source must be reduced to increase the F/No of an optical system. The reduction of the divergence angle increases the etendue of the light source, and accordingly, the F/No of an optical system is increased to facilitate organization of the optical system following the light source. If the angle of divergence at the light source is reduced to ±1°, $E_{light\ source}$ is equal to $\pi A \sin^2(1°)$, and accordingly, $\pi A \sin^2(1°)$ is equal to 1.53 (mm²-steradian). From equation $E_{light\ source} = E_{light\ valve}$, 13° of $\theta_{1/2}$ is obtained, and an optical system having an F/No of F/2.3 or smaller can be used.

Figure 5A:
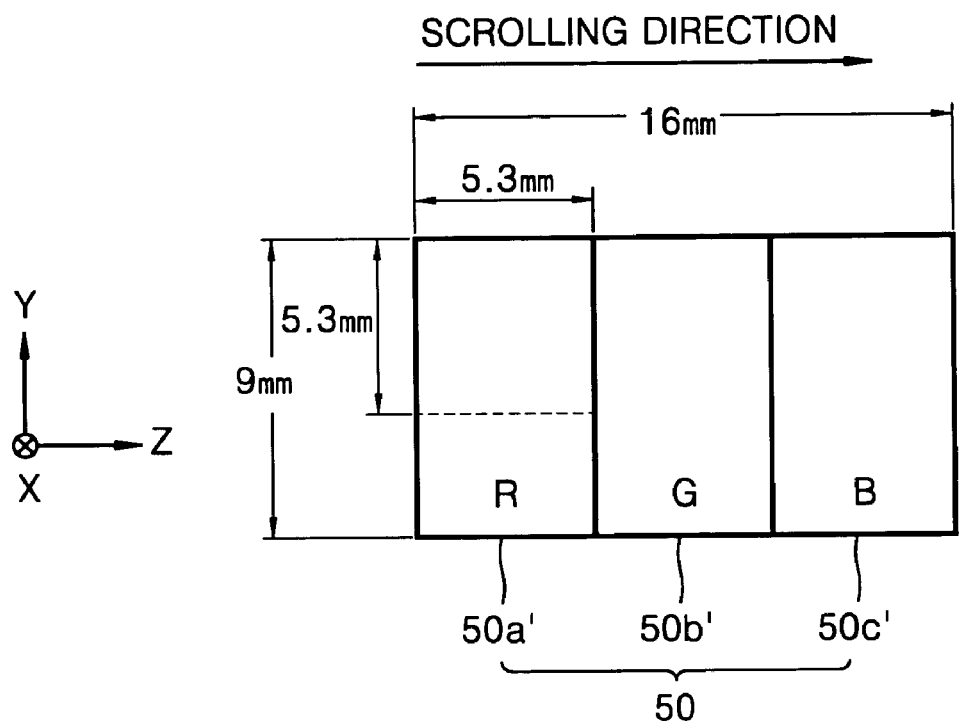
FIG. 5A shows an example of a color scrolling operation performed in the long axial direction of the light valve of FIG. 3B.

In a scrolling method according to the present invention, as shown in FIG. 5A, the light valve 50 is divided into three color areas 50a', 50b', and 50c' in the long axial direction (Z direction), and R, G, and B color beams are focused on each of the three color areas. As in FIG. 5A, when color bars formed in the long axial direction of the light valve 50 are scrolled, the short axis of each of the color areas 50a', 50b', and 50c' is 1.7 times greater than in the case of FIG. 4A. That is, if color bars are formed in the short axial direction of the light valve 50 as shown in FIG. 4A, the short axis of a color bar is 3.0 mm. If color bars are formed in the long axial direction of the light valve 50 as shown in FIG. 5A, the short axis of a color bar is 5.3 mm. Hence, the incidence angle at a light valve where long axial direction scrolling occurs is smaller than the incidence angle at a light valve where short axial direction scrolling occurs.

When the beam divergence angle of a light source is ±2 degrees, and A is 28.1 mm² (5.3 mm×5.3 mm), the incidence angle at the light valve 50 of FIG. 5A is calculated from $\theta_{1/2}$=15.2 degrees using Equation 5, and an optical system having an F/No of F/2.0 or smaller can be used. As described above, because the incidence angle upon the long axial direction scrolling is smaller than that upon the short axial direction scrolling, the angle of divergence of light by a light source does not need to be reduced.

The incidence angle at a light valve and the F/No of an optical system in the case of short axial direction scrolling as shown in FIG. 4A and those in the case of long axial direction scrolling as shown in FIG. 5A will be shown in Table 1.

TABLE 1

|  | Etendue of light source | Incidence angle at light valve | F/No |
| --- | --- | --- | --- |
| Long axial direction scrolling | 6.12 | 15.2° | F/2.0 |
| Short axial direction scrolling | 6.12 | 27° | F/1.3 |

Figure 5B:
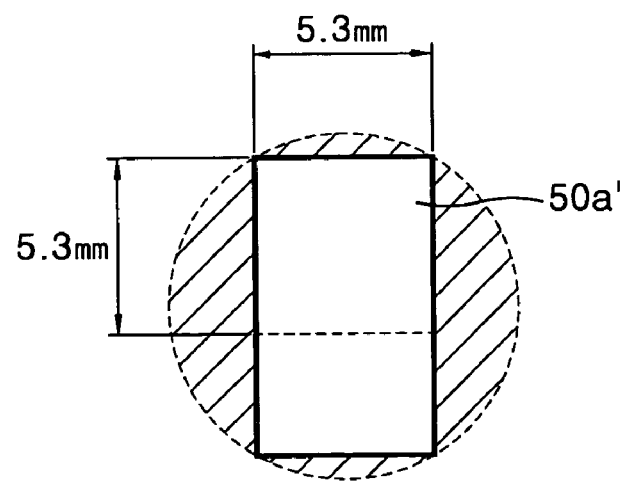
FIG. 5B shows a method of calculating etendue of a color bar in the case of FIG. 5A.

Referring to Table 1, when the same optical source is used, the angle at which light is incident upon a light valve is smaller when scrolling is performed in the long axial direction of the light valve than when scrolling is performed in the short axial direction of the light valve. Hence, light loss is smaller when scrolling is performed in the long axial direction of the light valve than when scrolling is performed in the short axial direction of the light valve. The former case is more effective than the latter case in view of the conservation of etendue. Also, in the former case, as the F/No increases, more beams are incident upon the light valve, and accordingly, light efficiency is increased. Comparing FIGS. 4B and 5B, it can be known that light loss is significantly smaller upon long axial direction scrolling than upon short axial direction scrolling. In FIGS. 4B and 5B, a hatched portion denotes a light loss portion.

Accordingly, it can be known that high light efficiency can be obtained even when the long axial direction scrolling method is used in a general optical system without a reduction in the angle at which a light source diverges light.

Figure 6A:
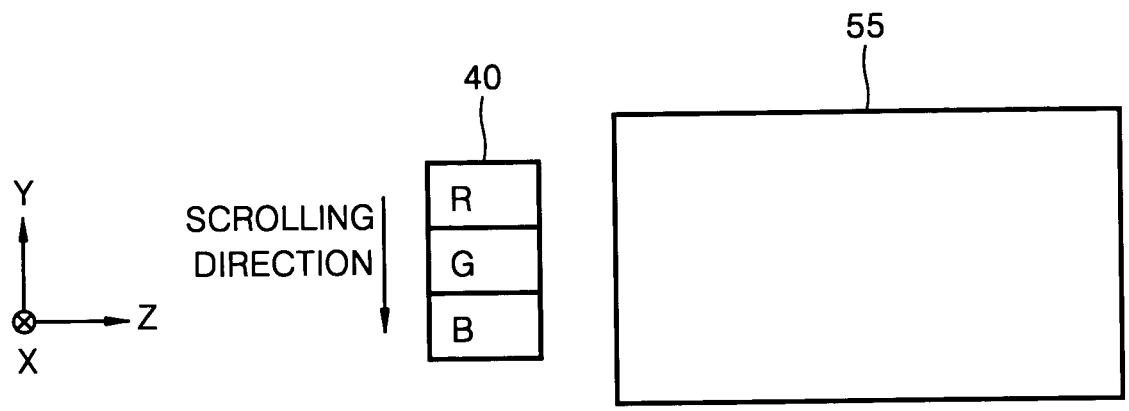
FIG. 6A shows a light valve and a screen which are disposed such that the long axis of the light valve is in the same direction as the short axis of the screen, in the case where scrolling is performed in the long axial direction of the light valve.

As shown in FIG. 6A, the light valve 40 is installed such that its long axial direction is the same as a color splitting direction, and color scrolling occurs in the long axial direction of the light valve 40. A screen 55 may be installed such that its short axis is in the long axial direction of the light valve 40. In this case, an image formed by the light valve 40 needs to be turned so that the entire image can be focused on the screen 55. Accordingly, the image formed on the light valve 40 must be turned 90 degrees.

Figure 6B:
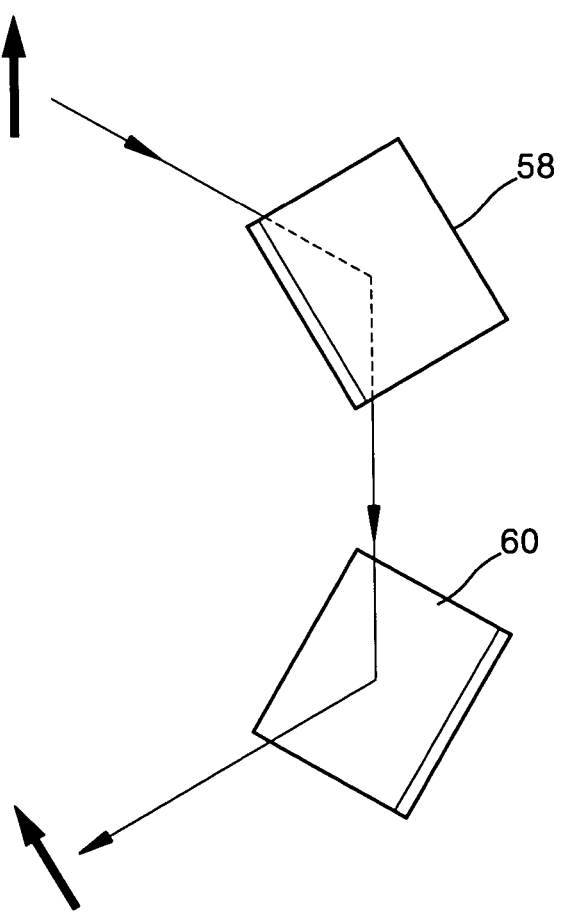
FIG. 6B shows units for rotating an image formed on a light valve so that the image is entirely focused on a screen in the case where the long axis of the light valve is in the same direction as the short axis of the screen as shown in FIG. 6A.

FIG. 6B shows a process of rotating an image by 90 degrees. For example, first and second reflection mirrors 58 and 60 may be included to rotate an image. The first reflection mirror 58 is inclined by 45 degrees with respect to the optical axis of an incident beam, and the second reflection mirror 60 is inclined by 45 degrees with respect to the optical axis of a beam reflected by the first reflection mirror 58. Preferably, the second reflection mirror 60 is inclined such that the beam reflected therefrom makes an angle of 90 degrees with the beam incident upon the first reflection mirror 58. Hence, an image formed on a light valve can be focused on a screen.

The first and second reflection mirrors 58 and 60 are needed in the case where the long axial directions of the light valve 40 and the screen 55 are different.

A color scrolling method according to the present invention is applicable to all types of projection systems that produce color images using a color scrolling technique, and is not limited to a color scrolling unit.

As described above, in a color scrolling method according to the present invention, long axial direction scrolling increases light efficiency much more than short axial direction scrolling, and light loss is reduced without special units for reducing the angle of divergence by a light source, thus obtaining a highly efficient optical system.

A projection system adopting a long axial direction scrolling method can easily improve light efficiency without the use of additional devices and increase the F/No of an optical system, thus obtaining a simple optical system. In other words, the angle at which a beam is incident upon a light valve is reduced, accordingly contributing to a reduction in the size of an optical system. Hence, a small lens can be used in a projection system, and accordingly, the manufacture of the lens can become easier. In a color scrolling system, because three color bars are formed on a light valve, the angle at which a beam is incident upon each of the three color bars increases, thus contributing to an increase in etendue. However, if color scrolling is performed in the long axial direction of the light valve, the etendue increase can be minimized, and a highly efficient projection system can be obtained without adding special units for reducing etendue.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A projection system in which
an optical splitter splits a beam emitted from a light source into individual color beams,
a scrolling unit scrolls the individual color beams and focuses the scrolled color beams on a light valve, and
the light valve processes the scrolled color beams according to an input image signal to form a color image, magnifies the color image, and projects the magnified color image toward a screen, wherein the light valve is disposed such that its long axis is in a direction in which the optical splitter splits the incident beam into individual color beams, so that light efficiency is increased;

wherein the screen is disposed such that its short axis is in the lone axial direction of the light valve; and wherein first and second reflection mirrors are included, wherein the first reflection mirror is inclined by 45 degrees in two planes with respect to an optical axis of a beam incident on the first reflection mirror, and the second reflection mirror is inclined by 45 degrees in two planes with respect to an optical axis of a beam incident on the second reflection mirror, such that a beam reflected by the second reflection mirror is rotated by 90 degrees from the beam incident upon the first reflection mirror.

2. The projection system of claim 1, wherein the scrolling unit comprises at least one lens cell, and a rotation of the scrolling unit is converted into a rectilinear motion of portions of the at least one lens cell defined by an area through which a beam passes.

3. The projection system of claim 2, wherein the at least one lens is spirally arranged.

4. The projection system of claim 2, wherein the at least one lens is a cylindrical lens.

5. The projection system of claim 2, wherein the scrolling unit is formed in a disk shape.

6. A color scrolling method comprising:

splitting a beam emitted from a light source into individual color beams using an optical splitter;

disposing a rectangular light valve such that its long axis is in the direction in which the optical splitter splits the beam;

scrolling the individual color beams in the long axial direction of the light valve;

rotating an incident beam by 90 degrees using a first reflection mirror, which is inclined by 45 degrees in two planes with respect to an optical axis of a beam incident on the first reflection mirror and a second reflection mirror, which is inclined by 45 degrees in two planes with respect to an optical axis of a beam incident on the second reflection mirror; and disposing a screen such that its short axis is in the long axial direction of the light valve.

7. A projection system comprising:

an optical splitter which splits a beam emitted from a light source into individual color beams; and a scrolling unit which scrolls the individual color beams;

a light valve, which processes the scrolled color beams according to an input image signal to form a color image, magnifies the color image, and projects the magnified color image toward a screen; and first and second reflection mirrors, wherein the first reflection mirror is inclined by 45 degrees in two planes with respect to an optical axis of a beam incident on the first reflection mirror, and the second reflection mirror is inclined by 45 degrees in two planes with respect to an optical axis of a beam incident on the second reflection mirror;

wherein the scrolling unit focuses the scrolled color beams on the light valve; and wherein the light valve is disposed such that its long axis is in a direction where the optical splitter splits the incident beam into individual color beams, so that light efficiency is increased, and the screen is disposed such that its short axis is in the long axial direction of the light valve.

* * * * *